(12) United States Patent
Xu

(10) Patent No.: US 9,629,018 B2
(45) Date of Patent: Apr. 18, 2017

(54) METHOD AND APPARATUS FOR TRIGGERING MANAGEMENT OF COMMUNICATION FLOW IN AN INTER-NETWORK SYSTEM

(71) Applicant: iBasis, Inc., Lexington, MA (US)

(72) Inventor: Richard H. Xu, Wakefield, MA (US)

(73) Assignee: IBASIS, INC., Lexington, MA (US)

( * ) Notice: Subject to any disclaimer, the term of this patent is extended or adjusted under 35 U.S.C. 154(b) by 168 days.

(21) Appl. No.: 14/173,180

(22) Filed: Feb. 5, 2014

(65) Prior Publication Data
US 2015/0223104 A1    Aug. 6, 2015

(51) Int. Cl.
*H04W 28/02* (2009.01)
*H04L 12/851* (2013.01)
*H04L 12/857* (2013.01)
*H04L 12/801* (2013.01)

(52) U.S. Cl.
CPC ..... *H04W 28/0231* (2013.01); *H04L 47/2483* (2013.01); *H04L 47/2491* (2013.01); *H04L 47/19* (2013.01); *H04L 47/2441* (2013.01)

(58) Field of Classification Search
CPC .................................................. H04L 47/2483
See application file for complete search history.

(56) References Cited

U.S. PATENT DOCUMENTS

| 5,940,512 A | 8/1999 | Tomoike |
| 6,085,084 A | 7/2000 | Christmas |
| 6,157,636 A | 12/2000 | Voit et al. |
| 6,658,458 B1 | 12/2003 | Gai et al. |
| 6,735,190 B1 | 5/2004 | Chuah et al. |

(Continued)

FOREIGN PATENT DOCUMENTS

| EP | 2 530 884 A1 | 12/2012 |
| EP | 2 675 111 A1 | 12/2013 |

(Continued)

OTHER PUBLICATIONS

McKeown, N., et al., "OpenFlow: Enabling Innovation in Campus Networks," retrieved from archive.openflow.org/documents/openflow-wp-latest.pdf (2008).

(Continued)

*Primary Examiner* — Chi H Pham
*Assistant Examiner* — Nourali Mansoury
(74) *Attorney, Agent, or Firm* — Hamilton, Brook, Smith & Reynolds, P.C.

(57) ABSTRACT

According to at least one example embodiment, a method and corresponding apparatus for triggering management of a data packet flow at an inter-network system include obtaining control-plane data exchanged between a first communications network and a second communications network. An identification of the data packet flow is then determined based on the control-plane data obtained. Once the identification of the data packet flow is known, management of the data packet flow is triggered by providing the identification of data packet flow determined to an inter-network device, e.g., a switch or OpenFlow switch. In triggering management of the data packet flow, a message may be sent to the inter-network device including the identification of data packet flow and one or more indications of management action(s) to be applied to data packets of the data packet flow by the inter-network device.

28 Claims, 8 Drawing Sheets

(56) References Cited

U.S. PATENT DOCUMENTS

| | | |
|---|---|---|
| 6,788,647 B1 | 9/2004 | Mohaban et al. |
| 7,184,764 B2 | 2/2007 | Raviv et al. |
| 7,738,465 B2 | 6/2010 | Akahane et al. |
| 8,095,124 B2 | 1/2012 | Balia |
| 8,537,695 B2 | 9/2013 | Wiley et al. |
| 8,593,958 B2 | 11/2013 | Zhang |
| 8,751,647 B1 | 6/2014 | Yip et al. |
| 9,060,263 B1 | 6/2015 | Carames et al. |
| 9,104,643 B2 | 8/2015 | DeCusatis |
| 9,137,140 B2 | 9/2015 | Tao et al. |
| 9,179,316 B2 | 11/2015 | Raleigh |
| 9,198,074 B2 | 11/2015 | Raleigh et al. |
| 9,288,750 B2 | 3/2016 | Tuli et al. |
| 2002/0080819 A1 | 6/2002 | Tsao |
| 2005/0152275 A1 | 7/2005 | Laurila et al. |
| 2006/0187942 A1 | 8/2006 | Mizutani |
| 2008/0049621 A1 | 2/2008 | McGuire et al. |
| 2009/0116398 A1 | 5/2009 | Shi et al. |
| 2010/0158009 A1 | 6/2010 | Lee |
| 2011/0310734 A1 | 12/2011 | Mizukoshi |
| 2012/0041965 A1 | 2/2012 | Vasquez et al. |
| 2013/0031191 A1 | 1/2013 | Bott |
| 2013/0054761 A1 | 2/2013 | Kempf et al. |
| 2013/0064079 A1 | 3/2013 | Zhang |
| 2013/0100819 A1 | 4/2013 | Anchan et al. |
| 2013/0114615 A1 | 5/2013 | Suemitsu et al. |
| 2013/0142073 A1 | 6/2013 | Shikitani |
| 2013/0195457 A1 | 8/2013 | Levy et al. |
| 2013/0230047 A1 | 9/2013 | Subrahmaniam et al. |
| 2014/0233399 A1 | 8/2014 | Mann et al. |
| 2014/0270764 A1 | 9/2014 | DeCusatis et al. |
| 2014/0301203 A1 | 10/2014 | Kampmann |
| 2014/0301397 A1 | 10/2014 | Zhou |
| 2014/0380470 A1 | 12/2014 | Taniuchi et al. |
| 2015/0032890 A1 | 1/2015 | Bott |
| 2015/0222554 A1 | 8/2015 | Xu |

FOREIGN PATENT DOCUMENTS

| | | |
|---|---|---|
| WO | WO 2007/047479 | 4/2007 |
| WO | WO 2010/023645 | 3/2010 |
| WO | WO 2015/119965 | 8/2015 |
| WO | WO 2015/119967 | 8/2015 |

OTHER PUBLICATIONS

"OpenFlow Switch Specification, Version 1.3.0 (Wire Protocol 0x04)," *The Open Networking Foundation*, pp. 1-105 (2012).

"Inter-Service Provider IP Backbone Guidelines, PRD IR.34, Version 4.9," *GSM Association, Official Document IR.34*, pp. 1-48 (2010).

Notification of Transmittal of International Search Report and the Written Opinion of the International Searching Authority, or the Declaration for International Application No. PCT/US2015/014304, entitled "Method and Apparatus for Triggering Management of Communication Flow in an Inter-Network System," consisting of 11 pages. Date of Mailing: Apr. 16, 2015.

Notification of Transmittal of International Search Report and the Written Opinion of the International Searching Authority, or the Declaration for International Application. No. PCT/US2015/014301, entitled "Method and Apparatus for Managing Communication Flow in an Inter-Network System," consisting of 10 pages. Date of Mailing: Apr. 22, 2015.

Non-Final Office Action for U.S. Appl. No. 14/173,160, entitled "Method and Apparatus for Managing Communication Flow in an Inter-Network System," consisting of 51 pages. Date of Mailing: Jul. 2, 2015.

Office Communication, U.S. Appl. No. 14/173,160, filed Feb. 5, 2014, date of communication Dec. 17, 2015.

Final Office Action for U.S. Appl. No. 14/173,160, entitled "Method and Apparatus for Managing Communication Flow in an Inter-Network System,". Date of Mailing: Jun. 16, 2016.

International Preliminary Report on Patentability for International Application No. PCT/US2015/014301, entitled "Method and Apparatus for Managing Communication Flow in an Inter-Network System,". Date of Mailing: Aug. 9, 2016.

International Preliminary Report on Patentability for International Application No. PCT/US2015/014304, entitled "Method and Apparatus for Triggering Management of Communication Flow in an Inter-Network System,". Date of Mailing: Aug. 9, 2016.

"Applying Network Policy Control to Asymmetric Traffic: Considerations and Solutions," *Sandvine Intelligent Broadband Networks, An Industry Whitepaper*, Version 2.0, pp. 1-14.

LTE International Roaming Whitepaper, http://carrier.huawei.com/en/technical-topics/core-network/LTE-roaming-whitepaper, pp. 1-16 [retrieved on Apr. 22, 2016].

Manulis, M., et al, "Authenticated Wireless Roaming via Tunnels: Making Mobile Guests Feel at Home," Proceedings of the ACM Symposium on Information, Computer and Communications Security (ASIACCS'09), pp. 1-22 (2009).

"Online Charging with Diameter Gy: Considerations for Accuracy and Reliability," Sandvine Intelligent Broadband Networks, An Industry Whitepaper, Version 2.0, pp. 1-10.

"Syniverse Hosted Roaming Policy Management, "Syniverse Technologies, LLC., pp. 1-3 (2015).

"Syniverse Roaming Control Center," Syniverse Technologies, LLC., pp. 1-3 (2014).

"Syniverse Roaming Intelligence Suite," Syniverse Technologies, LLC., pp. 1-3 (2014).

"Syniverse User Experience Management," Syniverse Technologies, LLC., pp. 1-5 (2016).

Non-Final Office Action for U.S. Appl. No. 14/173,160, Date Mailed: Feb. 16, 2017.

| Byte Index (UDP data) | Byte Index (IP Data) | Bits | | | | | | | |
|---|---|---|---|---|---|---|---|---|---|
| | | 8 | 7 | 6 | 5 | 4 | 3 | 2 | 1 |
| 1 | 9 | Version | | | PT | (*) | E | S | PN |
| 2 | 10 | Message Type | | | | | | | |
| 3 | 11 | Length (1st Octet) | | | | | | | |
| 4 | 12 | Length (2nd Octet) | | | | | | | |
| 5 | 13 | Tunnel Endpoint Identifier (1st Octet) | | | | | | | |
| 6 | 14 | Tunnel Endpoint Identifier (2nd Octet) | | | | | | | |
| 7 | 15 | Tunnel Endpoint Identifier (3rd Octet) | | | | | | | |
| 8 | 16 | Tunnel Endpoint Identifier (4th Octet) | | | | | | | |
| 9 | 17 | Sequence Number (1st Octet)[1) 4)] | | | | | | | |
| 10 | 18 | Sequence Number (2nd Octet)[1) 4)] | | | | | | | |
| 11 | 19 | N-PDU Number[2) 4)] | | | | | | | |
| 12 | 20 | Next Extension Header Type[3) 4)] | | | | | | | |

FIG. 3B

METHOD AND APPARATUS FOR TRIGGERING MANAGEMENT OF COMMUNICATION FLOW IN AN INTER-NETWORK SYSTEM

BACKGROUND

Service providers in general and mobile network operators (MNOs) in particular provide a range of communications' services to corresponding subscribers. Such services include, for example, voice, voice over Internet Protocol (IP), voice over long term evolution (LTE), streaming, broadcasting, multicasting, or other services. In providing such services, service providers typically implement different functionalities, e.g., billing functionalities, quality of service (QoS) functionalities, etc., to manage the offered services and the corresponding usage by subscribers.

In order to expand geographical coverage of offered services beyond the network coverage of each service provider, service providers typically engage in interworking and roaming arrangements. The interworking and roaming arrangements between different service providers are made possible through interconnection between the service providers. Interconnection between service providers is typically realized through one or more inter-service provider systems. Given that the Internet Protocol (IP) is widely employed across different communication networks and different services associated with service providers, the inter-service provider systems are typically designed to provide interconnection between different service providers at the IP traffic level, and to employ IP addressing. Examples of such inter-service provider systems include General Packet Radio Service (GPRS) Roaming eXchange (GRX) networks and IP Packet eXchange (IPX) networks. Interconnection between service providers may be achieved through an inter-service provider IP backbone, which represents a collection of GRX and/or IPX networks.

SUMMARY

Management, e.g., monitoring usage, monitoring quality of service (QoS), throttling throughput, collecting statistics, the like, or a combination thereof, of data packet flows at the user level, or session level, is typically performed at service provider networks, e.g., home and/or visited networks. For roaming services, management of the data packet flows puts substantial burden on service providers in terms of cost and network complexity.

According to at least one example embodiment, a method and corresponding apparatus for triggering management of a data packet flow at an inter-network system include obtaining control-plane data, e.g., session initiation protocol (SIP) data, general packet radio service (GPRS) tunneling protocol (GTP) data, or the like, exchanged between a first communications network and a second communications network. An identification of the data packet flow, e.g., a tunnel ID, session ID, user ID, or the like, is then determined based on the control-plane data obtained. Once the identification of the data packet flow is known, management of the data packet flow is triggered by providing the identification of data packet flow determined to an inter-network device, e.g., a switch or OpenFlow switch.

According to at least one aspect, in obtaining the control-plane data, the apparatus receives the control-plane data from the inter-network device. The inter-network device accesses, at a communications link, the control-plane data and provide it to the apparatus. Alternatively, the control-plane data may be accessed directly from the communications link by the apparatus. The control-plane data may be all the control-plane data packets passing through the communications link, a filtered set of the control-plane data packets passing through the communications link, one or more portions of control-plane data packets, one or more fields or headers associated with control-plane data packets, or the like. The filtering of control-plane data packets, or extraction of corresponding portions, may be performed by the inter-network device and/or other network devices, e.g., a controller associated with an OpenFlow switch.

According to at least one aspect, determining an identification of the data packet flow includes, for example, extracting one or more transport protocol, and/or session protocol, fields from the control-plane data obtained, and/or decoding the one or more transport protocol, and/or session protocol, fields. The transport protocol may be user datagram protocol (UDP) or transport control protocol (TCP), or any other transport protocol known to people skilled in the art.

According to at least one aspect, triggering management of the data packet flow may be achieved by sending instructions/messages including the data packet flow identification determined and indication(s) of one or more management actions to be applied to the data packet flow.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3B is a table illustrating an example of transport protocol data read by the OpenFlow switch;

DETAILED DESCRIPTION

A description of example embodiments of the invention follows.

Wireless communication networks offer multiple wireless services to their subscribers. For each network provider, the consumption of such services by the corresponding subscribers is typically managed within the provider's network. When a subscriber of a home wireless network is roaming in a visited network, the consumption of services by the roaming subscriber is typically managed by the home network or the visited network.

Network providers typically implement hardware and software solutions in their networks for managing consumption of communications' services by their corresponding subscribers. In particular, as a subscriber initiates a service, one or more functionalities are executed at the corresponding home network to manage, for example, service consumption, billing, service quality, routing, or the like. When the subscriber roams to a visited network, different from the home network, such managing functionalities are carried out collaboratively by the home and visited networks.

Handling roaming services at the home and visited networks requires that both the home and visited networks implement roaming and service management functionalities. Implementing such functionalities at each network acting as a home or visited network puts a cost burden on network providers. Specifically, for a given network to service roaming subscribers associated with multiple other networks, the given network, acting as a visited network, typically implements roaming and service managing functionalities for each of the multiple other networks. As such, network providers assume significant network costs in supporting roaming services for subscribers associated with other networks.

According to at least one example embodiment, roaming and service managing functionalities are provided by an inter-network system intermediate between multiple corresponding service provider networks. In other words, instead of having such functionalities implemented at each service provider network, the inter-network system provides such functionalities with regard to communication services associated with the multiple service provider networks. However, implementation of some service management functionalities involves use of information specific to the managed service that is typically accessible only at the home network or visited network associated with the managed service. In the following, embodiments of implementing such functionalities at an inter-network system are presented.

Figure 1:
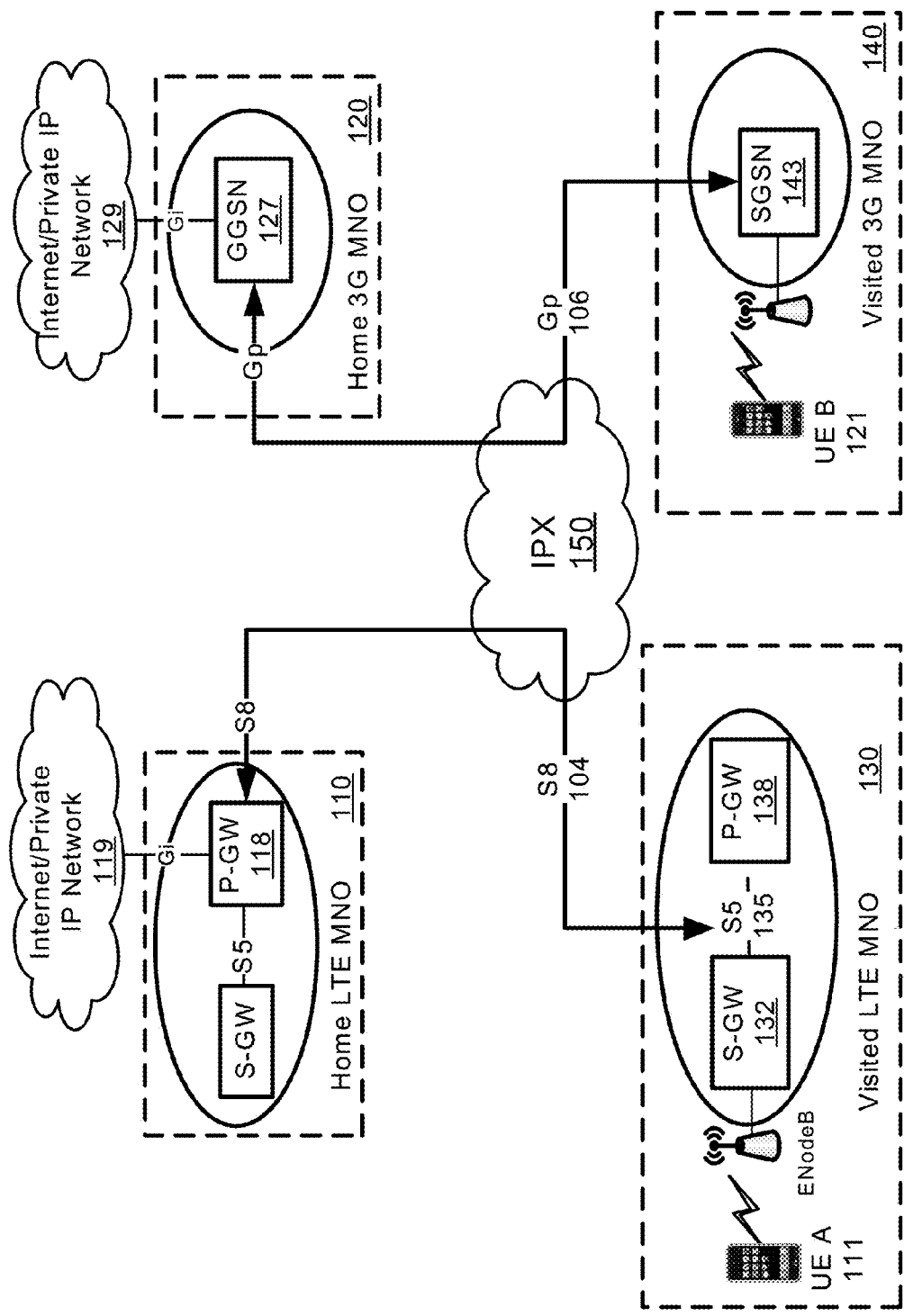
FIG. 1 is a communications system employing an inter-network hub intermediate between multiple wireless networks, according to at least one example embodiment.

FIG. 1 is a communications system 100 employing an IP packet eXchange (IPX) system 150 intermediate between multiple wireless networks, e.g., 110, 120, 130, and 140. Specifically, the communications system 100 depicts an architecture supporting roaming services, and other services, associated with both third generation (3G) networks, e.g., 120 and 140, and long term evolution (LTE) networks, e.g., 110 and 130. According to at least one example embodiment, in LTE roaming, the IPX system 150 provides IP transport between a serving gateway (S-GW) 132 in a visited LTE network 130 and a packet data network (PDN) gateway (P-GW) 118 in a Home LTE network 110. In 3G roaming, the IPX system 150 provides IP transport between a serving GPRS support node (SGSN) 123 of a visited 3G network 140 and a gateway GPRS support node (GGSN) 127 in a home 3G network 120.

In LTE, the interface between the visited S-GW 132 and the home P-GW 118 is referred to as S8 in interface 104. The S-8 interface 104 is a tunnel protocol based on IP user datagram protocol (IP-UDP), and enables user equipment (UE), e.g., 111, to access an IP packet network 119 through the home P-GW 118. In 3G roaming, the interface between visited SGSN 143 and the home GGSN 127 is referred to as Gp interface 106. The Gp interface 106 is also an IP-UDP based tunnel protocol with a different version, compared to the S8 interface. The Gp interface 106 enables the UE 121 to access an IP packet network 129 through the home GGSN 127. User data packets are exchanged across the IPX system 150 using a GPRS tunneling protocol (GTP). The GTP usually employs UDP and has different versions in 3G and LTE networks.

The data transferred across the S8 interface 104, or the Gp interface 106, typically includes control-plane data and user-plane data. Typically, a control channel and a user data channel are established between the two network elements, e.g., S-GW 132 and P-GW 118 or SGSN 143 and GGSN 127, in response to a network access request. Control-plane data is usually exchanged through the control channel between the S-GW 132, or SGSN 143, and the P-GW 118, or GGSN 127, to setup/delete a packet data protocol (PDP) context for a UE, e.g., 111 or 121. In particular, resources and tunnel identification associated with a user communications call or session are negotiated, based on a user's identification and policy, at the control-plane in response, for example, to a network access request. The negotiated parameters are then used to establish, and/or maintain, a user data channel, or tunnel. User data is typically transferred between service provider networks, e.g., 130 and 110 or 140 and 120, through the user data channel established. Data packets sent across the GTP tunnel, e.g., 104 or 106, are de-multiplexed at the P-GW 118, or GGSN 127, and then forwarded, for example, to the external packet network, e.g., 119 or 129. Also, data packets received from the external packet network, e.g., 119 or 129, are multiplexed by the P-GW 118, or GGSN 127, and sent through the GTP tunnel, e.g., 104 or 106, to UEs, e.g., 111 or 121.

The control-plane mechanism may be implemented using, for example, the GTP-control (GTP-C) protocol, proxy mobile IP (PMIP), session initiation protocol (SIP), or the like. For example, the Gp interface 106 employs GTP-C version 1, whereas the S8 interface 104 employs GTP-C version 2. Similarly, the user data plane mechanism may be implemented in various ways. For example, when GTP-C version 1 is employed as the control protocol, the GTP-User (GTP-U), version 0 or 1, protocol is employed for user data transfer, for example, across the Gp interface 106. Also, the GTP-U version 1, which is updated in 3rd Partnership Project (3GPP) specifications to support LTE, is typically employed in transferring user data, for example, across the S8 interface 104, when the GTP-C version 2 protocol is employed as the corresponding control protocol. In applications such as voice-over-IP (VoIP), voice-over-IP Multimedia Subsystem (Voice-over-IMS), or voice-over-LTE (VoLTE), SIP is used as the control-plane protocol and the real-time transport protocol (RTP), or the real-time control protocol (RTCP), is used as the user data plane protocol.

At the control-plane, control messages are typically exchanged between the S-GW 132, or SGSN 143, serving the UE 111 or 121 and the P-GW 118, or GGSN 127, configured to provide connectivity to external packet data networks, e.g., 119 or 129. Specifically, upon the UE 111 or 121 requests network access, a message requesting creation of a PDP session or context is sent from the S-GW 132, or SGSN 143, to the P-GW 118, or GGSN 127. The P-GW 118, or GGSN 127, responds back with the details of a created PDP context or with a failure message. For example, in GTP-C version 1 protocol, the messages "Create PDP Context Request" and its response "Create PDP Context Response" message are used. In GTP-C version 2 protocol, the control message "Create Session Request" and the corresponding response message "Create Session Response" are employed. In the PMIP protocol, the messages "Proxy Binding Update" and "Proxy Binding Ack" are used to initiate a session.

The IPX network 150 is typically designed to support connections between service providers at the first, second, and/or third network layers. That is, the IPX network 150 is typically configured to access tunnel-specific information in data packets exchanged between two tunnel end points, such as S-GW 132 and P-GW 118. In other words, the IPX network 150 typically accesses information associated with the first, second and third network layers within data packets. The IPX network 150, for example, does not access information within data packets indicative of user-specific or session specific data flows, e.g., information associated with the fourth and/or fifth network layers. As such, IPX network providers of existing IPX networks do not provide control services for usage monitoring and quality of service (QoS), for example, at the UE level. Services' management functionalities typically performed by mobile operators, such as, monitoring a service usage by users while roaming, notifying users when usage reaching a certain level, enforcing QoS, or throttling control to each UE's data session, are typically not offered by IPX given the limited visibility with respect to information associated with exchanged data packets exchanged across the IPX network 150.

In order to provide communications services for roaming users, both the home and visited networks typically implement roaming and service management functionalities. Implementing such functionalities at each network acting as a home or visited network puts a cost burden on mobile network providers (MNOs). Specifically, for a given network to service roaming subscribers associated with multiple other networks, the given network acting as a visited network, typically implements roaming and service managing functionalities for each of the multiple other networks acting as home networks. As such, network providers assume significant network costs in supporting roaming services for subscribers associated with other networks.

According to at least one example embodiment, at least one service managing, or roaming, functionality is provided by an inter-service provider network, e.g., IPX network 150, intermediate between multiple wireless networks, e.g., 110, 120, 130, and 140, associated with different MNOs. In other words, instead of having such functionalities implemented at each wireless network, the IPX network 150 provides one or more of such functionalities with regard to communications' services associated with at least one of the multiple wireless networks. Specifically, transport-layer information of data exchanged across a control channel between service provider networks is accessed at the inter-service provider network, e.g., IPX 150, and employed to manage at least one corresponding data packet flow. That is, control-plane messages exchanged between the S-GW 132, or SGSN 143, and the P-GW 118, or GGSN 127, are intercepted at the inter-service provider network, e.g., IPX 150, and corresponding transport-layer information, or information from upper layer(s), is obtained. According to at least one aspect, the transport layer information is used to identify the at least one corresponding data packet flow. Information identifying the at least one corresponding data packet flow is used by an open flow switch (OFS) to manage the at least one corresponding data packet flow.

Typical OpenFlow Switch (OFS) characteristics are the subject of specifications of an open standard, and are designed to enable researchers to run test experiments on switches of existing networks, e.g., university campus networks, without knowledge about the internal workings of the switches. OpenFlow switches are typically added as a feature to commercial Ethernet switches, routers and wireless access points, and provide a standardized hook to allow a third party to run experiments and control the switches without requiring vendors to expose the internal workings of their network devices.

In a typical router or switch, fast packet forwarding, or data path, and high level routing decisions, or control path, usually occur on the same device. An OFS enables separation of the data path and control path functions. In particular, when an OFS is employed, the data path portion functionality still resides on the switch, while high-level routing decisions are handled at a separate controller associated with the OFS. The OFS and the corresponding controller communicate via a secure mechanism according to an OpenFlow Protocol. The OpenFlow protocol defines multiple ways of identifying a communication flow based on layer two, or data link layer, frames and layer-three information, e.g., IP header. The use of layer-two and layer-three information usually allows identification of a group of data packet flows associated with one or more IP addresses and multiplexed together in one or more shared data frames. However, the layer two and layer three information does not allow identification of a single data packet flow, e.g., a data packet flow associated with a user, call, or communication session. As such, the information typically accessed in an OFS does not allow management of a single data packet flow, e.g., a data packet flow associated with a user, call, or communication session.

Figure 2:
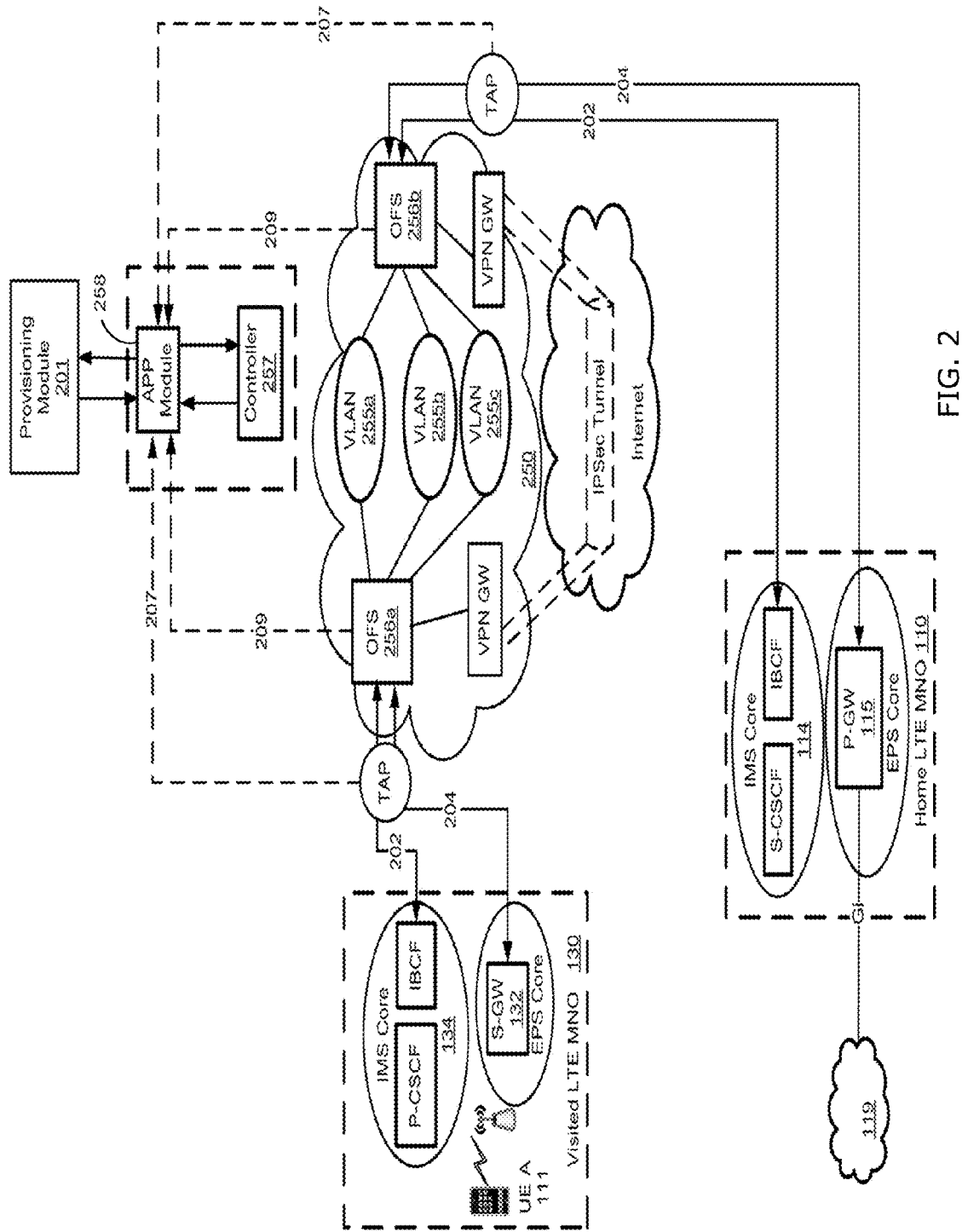
FIG. 2 is a block diagram of a communications system including an IP packet eXchange (IPX) network providing one or more management functionalities of data packet flows, according to at least one example embodiment.

FIG. 2 is a block diagram of a communications system 200 including an IP packet eXchange (IPX) network 250 providing one or more management functionalities of data packet flows, according to at least one example embodiment. The IPX network 250 is coupled to multiple MNO networks, e.g., 110, and 130. A person skilled in the art should appreciate that for the sake of simplicity, FIG. 2 shows only two MNO networks 110 and 130 coupled to the IPX network 250. However, the IPX network 250 may be coupled to two or more MNO networks and/or other service provider networks. For example, the IPX network 250 may be further coupled to the mobile networks 120 and 140 as in FIG. 1.

The UE 111 roams to the visited LTE network 130 and initiates one or more data sessions, or calls. The one or more data sessions, or calls, include, for example, a web browsing or Internet access session, VoIP call, VoLTE call, voice-over-IMS call, teleconference session, local area network (LAN) access session, private network access session, the like, or a combination thereof. Data packet flow(s) associated with the initiated one or more data sessions, or calls, are routed through the home network 110 based on, for example, home routing procedure. The data packet flows include, for example, a SIP/RTP data packet flow 202 or a S8 GTP data packet flow 204. The SIP/RTP data packet flow 202 is usually between an IMS core 134 associated with the visited LTE network 130 and an IMS core 114 associated with the home LTE network 110. The S8 GTP data packet flow is usually between the S-GW 132 of the visited LTE network and the P-GW 118 of the home LTE network 110.

According to at least one example embodiment, the IPX network 250 includes one or more OpenFlow switches, e.g., 256a and 256b. The one or more OpenFlow switches, e.g., 256a and 256b, are coupled to a controller 257. The controller 257 and a corresponding OFS, e.g., 256a or 256b, referred to hereinafter as 256, communicate using a secure mechanism and an OpenFlow protocol control channel 209.

The system 200 also includes an application module 258 coupled to a corresponding OFS 256 through the controller 257. A person skilled in the art should appreciate that the IPX network 250 may be implemented differently. For example, a separate controller and separate application module may be assigned to each OFS in the IPX network 250.

In a typical OFS architecture, the controller is configured to handle high-level routing decisions for the OFS. The OFS typically includes a flow table carrying information indicative of data paths, and a software agent configured to manage messages exchanged with the controller, such as packet-received, send-packet-out, modify-forwarding-table, and get-statistics. Each flow table entry contains, for example, (1) a packet header that defines a group of data packets, (2) an action, e.g., send-out-port, modify-field, or drop, defining how the group of data packets is to be processed, and (3) statistics to keep track of the number of data packets and bytes processed in the corresponding identified group, and the time since the last processed data packet in the identified group. In existing Open Flow switches, a group of data packets is typically identified, within a corresponding flow table entry, based on layer-two frame and layer-three, e.g., IP Header, information. Such information does not identify individual data packet flows associated, for example, with a given user, UE, or communication session, but rather defines a group of data packet flows associated, for example, with a shared IP address. In other words, the layer two and layer three information, typically employed in existing OpenFlow switches, does not allow identification of data packet flows at the user or communication session level, and, as such, does not allow management and/or control of such individual data packet flows.

According to at least one example embodiment, the OpenFlow switch 256 makes use of transport layer, i.e., layer four, and/or session layer, i.e., layer five, information in identifying corresponding data packet flows to be tracked and managed. According to at least one aspect, control-plane data traversing the IPX network 250 is intercepted, e.g., via TAP at link level 207 or using OFS packet-in 209, and transport layer, and/or session layer information, identifying a particular data packet flow is determined. In particular, information identifying one or more users, one or more UEs, or the like, is used to determine at least one control-plane data packet associated with, for example, SIP or GTP-C traffic traversing the IPX network 250. For example, international mobile subscriber identity (IMSI), or a range of IMSIs, is used to determine the at least one control-plane data packet. According to at least one aspect, a provisioning module 201 provides the information identifying one or more users, one or more UEs, or the like, to the application module 258 or the controller 257. Once the at least one control-plane data packet is determined, information identifying at least one data packet flow, at the user-plane, is extracted from the determined at least one control data packet. Information identifying the at least one data packet flow includes, for example, a tunnel identifier (ID), a session identifier, the like, or a combination thereof. The information identifying the at least one data packet flow is then employed by the OpenFlow switch 256 to manage the identified at least one data packet flow at the user-plane level.

The provisioning module, or system, 201 informs the application module 258 which international mobile subscriber identity (IMSI) needs to be monitored at which Open Flow Switch, e.g., 256a or 256b. It may also inform the application module 258 what statistics information needs to be sent back once acquired by the controller 257. The provisioning module, or system, 201 also indicates that one or more OpenFlow switches, e.g., 256a or 256b, are to be deployed at the edge of the IPX network 250, where the mobile operators, e.g., 110 and 130, connect to the IPX network 250. The ingress and egress data packets are configured to go through the OpenFlow switch 256 for management applications to be applied to data packet flow(s) of interest. For example, the typical S8 204 interface and corresponding traffic between the visited S-GW 132 and the home P-GW 118 are configured to traverse one or more OpenFlow Switches, e.g., 256a or 256b, within the IPX 111.

The provisioning module, or system, 201 is configured to acquire, for example, a targeted user's data usage, and send a text message or email to the end user if the data usage reaches a certain level. The text message or email alerts the targeted user to avoid being over charged if the maximum allowed data usage is surpassed. Such notification is required by many governments around the globe to protect end users as consumers. Besides monitoring users' data usage and notifying the users, the provisioning module, or system, 201 may inform the application module 258 of other management applications to be performed to specified users or services, such as throttling control of each identified data packet flow using OpenFlow Switch's throttling control feature to cap the maximum throughput of each identified data packet flow.

According to at least one example embodiment, once information identifying a data packet flow is determined, the controller 257 instructs a corresponding OpenFlow switch 256 to manage the identified data packet flow according to specified action(s). That is, the controller 257 provides an identification of a data packet flow and a corresponding management action to the OpenFlow switch, e.g., 256a or 256b, through the interface 209. The data packet flow identification may be a set of packet fields obtained from control-plane data associated with the data packet flow to be managed. The management action includes, for example, monitoring usage associated with the data packet flow, getting the data packet flow statistics, throttling the data packet flow based on network conditions or service policy, setting specific QoS to the data packet flow, routing the data packet flow to a different egress port, the like, or a combination thereof. According to at least one aspect, the identification of the data packet flow and the corresponding management action for handling the data packet flow are stored within a corresponding entry of the flow table of the OpenFlow switch 256. The OpenFlow switch 256 then checks user-plane data to identify user-plane data packets with packet fields matching those identifying the data packet flow to be managed. The user-plane data packets determined to have matching packet fields as the ones obtained from control-plane data and stored in the corresponding flow table entry are handled by the OpenFlow switch 256 according to the action indicated in the same flow table entry.

According to at least one aspect, if the action specified by the controller indicates usage monitoring, the OpenFlow switch 256 keeps track of the amount of data, e.g., in bytes or in packets, exchanged within the identified data packet flow. Alternatively, the OpenFlow switch 256 may keep track of a time duration, or another usage measure, associated with the identified data packet flow. If the action indicates measuring of statistics associated with the identified data packet flow, the OpenFlow switch 256 monitors data packets associated with the identified data packet flow and computes the specified statistics. The OpenFlow switch 256 may then report measured usage, or statistics, to the controller 257 or to the application module 258 through the controller 257. However, if the action indicates throttling of the identified data packet flow, the OpenFlow switch 256 delays, or drops, data packets associated with the identified data packet flow. Also, if the action relates to setting specified QoS for the identified data packet flow, the OpenFlow switch 256 may monitor the data rate, and/or other parameter(s), of the identified data packet flow and handle data packets associated with the identified data packet flow in way to guaranty a service quality according to specified QoS values. For example, the OpenFlow switch may delay or prioritize handling of data packets associated with the identified data packet flow to guarantee a specified data rate.

According to at least one example embodiment, the OpenFlow switch 256 is configured to distribute or route different data packet flows to different backbones or virtual local area networks (VLANs), e.g., 255a, 255b, and 255c also referred to as 255, within the IPX network 250 based on, for example, different policies associated with corresponding users. In particular, each VLAN 255 is associated with different policies in terms of bandwidth and QoS handling for certain type of traffic. For example, the VLAN 255a is configured to handle voice-based service, e.g., VoLTE interworking, VoLTE roaming, and VoIP, and provide "premium" bandwidth and QoS. The VLAN 255a is referred to as "premium VLAN for voice." The VLAN 255b is configured to handle S8 traffic for certain users providing with policies offering specified bandwidth and QoS. The VLAN 255b is referred to as "Premium IPX VLAN." The VLAN 255c is configured to handle regular S8 traffic with provided bandwidth depending on network conditions. For example, regular S8 traffic may be dropped if congestion is experienced within, for example, the IPX network 250. The VLAN 255c is referred to as "regular IPX Bearer VLAN."

According to at least one aspect, specific provisioning information associated with one or more users is provided by the provisioning module 201 to the application module 258 or the controller 257. The provisioning information includes information identifying user(s) or corresponding UE(s), such as, an IMSI, a range of IMSIs, a mobile station international subscriber directory number (MSISDN), or a group of MSISDNs, that is employed to identify communication session(s) or corresponding data packet flow(s) based on control-plane data. The provisioning information may also include information indicative of policies associated with the identified user(s). According to at least one aspect, the information indicative of the policies is translated into actions, for example, by the application module 258 or the controller 257, for performing by the OpenFlow switch 256 on identified data packet flow(s). Some of actions performed by the OpenFlow switch 256 include, for example, setting QoS configurations, e.g., by setting differentiated services code point (DSCP) value(s) within a DSCP header, or forwarding the identified data packet flow(s) to a designated port coupled to a corresponding designated VLAN. Once the identified data packet flow enters the designated VLAN, e.g., 255a, 255b, or 255c, other forwarding or routing actions are taken according to network management policies associated with the designated VLAN, e.g., 255a, 255b, or 255c.

According to at least one aspect, the OpenFlow switch 256 may forward some identified data packet flows via a designated connection to a first virtual private network (VPN) gateway (VPN GW) 251a where the corresponding traffic is forwarded, through an IP security (IPSec) protocol tunnel pre-established over the Internet, to a second VPN GW 261b. Such routing approach enables off-loading, for example, low priority traffic to the Internet and leaving more bandwidth and resources within the IPX network for handling traffic with higher priority, such as, voice, streaming data, signaling, or the like.

Figure 3A:
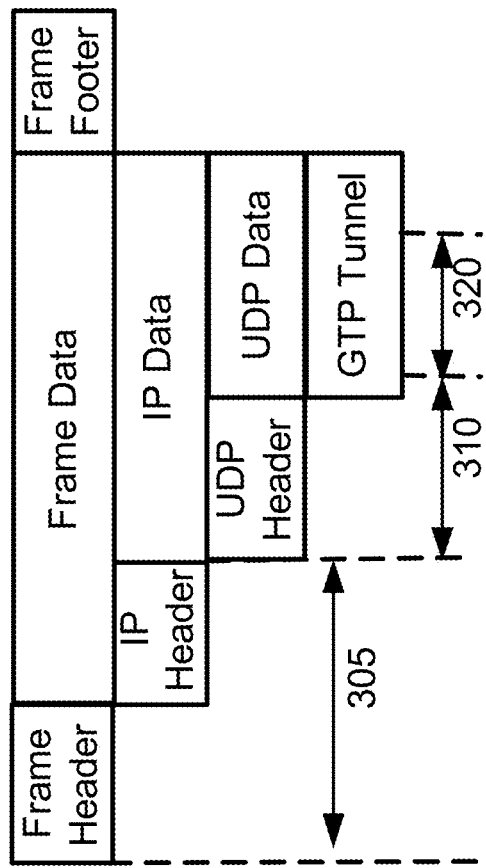
FIG. 3A is a diagram illustrating identification of data packets associated with a specific data packet flow, according to at least one example embodiment.

FIG. 3A is a diagram illustrating identification of data packets associated with a specific data packet flow, according to at least one example embodiment. Existing OpenFlow switches typically identify data packets of interest by checking corresponding layer two and layer three data fields 305 in intercepted data packets against corresponding field values maintained in a corresponding flow table entry. According to at least one example embodiment, the OpenFlow switch 256 is configured to check beyond layer two and layer three data fields in intercepted data packets. Specifically, transport layer, and/or session layer, data fields of the data packets traversing the OpenFlow switch 256 are checked against corresponding transport protocol, and/or session protocol, field values maintained in the corresponding flow table entry. That is, OpenFlow switches 256 employed, employed according to embodiments of the present invention(s), are configured to read layer four, and/or layer five, data from intercepted data packets, and compare the read data to corresponding field values maintained at a flow table entry for potential match.

In the example diagram of FIG. 3A, data packets associated with a data packet flow of interest are identified based on UDP data. The data packet flow of interest employs UDP as the transport protocol. For each data packet traversing the OpenFlow switch 256, the OpenFlow switch 256 checks UDP fields within the data packets against corresponding field values identifying the data packet flow of interest. If a match is found, the corresponding data packet is determined to belong to the data packet flow of interest and is handled, by the OpenFlow switch 256, according to defined management action(s) associated with the data packet flow of interest. For example, specific bytes within the UDP Data are compared to the field values identifying the data packet flow of interest. According to at least one aspect, the specific bytes within the UDP data are defined based on a bit position 310, e.g., from start of IP data, and number of bytes 320 to be read. As such, the OpenFlow switch 256 reads the data portion indicated by the defined bit position 310 and the number of bytes 320, and compares it to the corresponding field values identifying the data packet flow of interest.

FIG. 3B is a table illustrating an example of transport protocol data read by the OpenFlow switch 256. The first column of the table in FIG. 3B indicates the byte index starting at the end of the UDP header, whereas the second column indicates the byte index with the end of the IP header as reference. If the bit position 310 is 12 bytes from start of IP data, e.g., starting at byte number 13 of IP data, and the number of bytes to be read 320 for potential matching is four, then the range of bytes 13-16 is read by the OpenFlow switch 256. According to the example of FIG. 3B, the range of bytes 13-16 corresponds to the tunnel ID field in GTP-U header. The tunnel ID field identifies a data packet flow corresponding to a single user data session in LTE or 3G networks. A person skilled in the art should appreciate that the bit position or the number of bytes defined may take other values. Also, a person skilled in the art should appreciate that the data to be read by the OpenFlow switch 256 may be defined in a different way, for example, based on start and end positions. The OpenFlow switch 256 simply decodes the data read to extract the information. The OpenFlow switch 256 is configured to read any data in any location in this way.

Figure 4A:
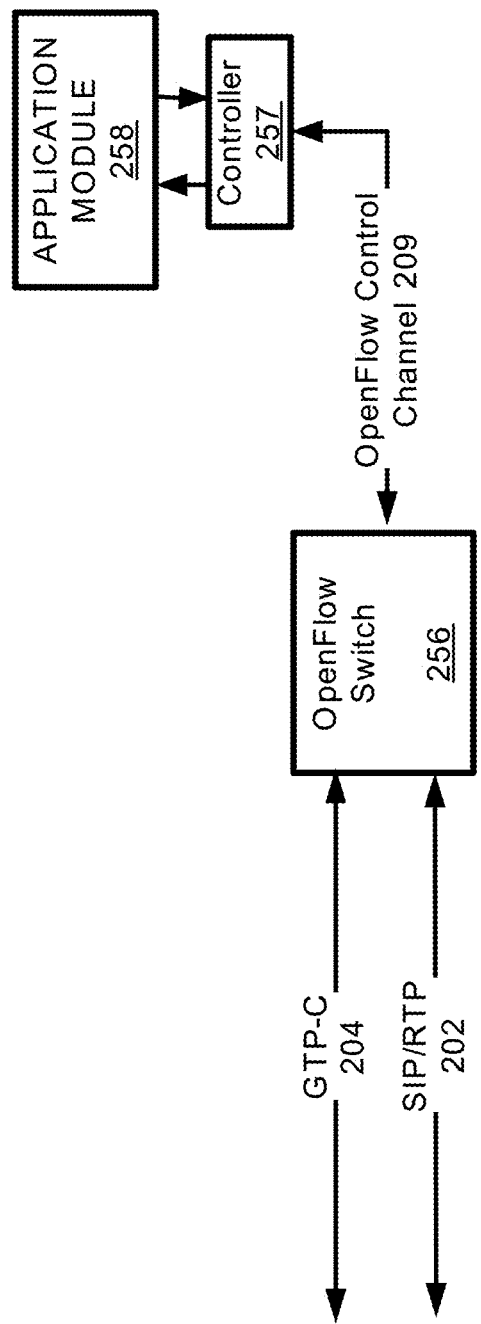
FIG. 4A is a block diagram illustrating access of control-plane data to identify a data packet flow, according to a first example embodiment.

FIG. 4A is a block diagram illustrating access of control-plane data to identify a data packet flow, according to a first example embodiment. According to at least one aspect, control channel data is collected by the OpenFlow switch 256 using an OpenFlow control port. A person skilled in the art should appreciate that the control channel may be on the same, or separate, physical link as the corresponding user data channel. The OpenFlow switch 256 is configured to send specific type of traffic, e.g., UDP traffic with specific destination port number, to the controller 257 via the OpenFlow protocol control channel 209. The controller 257 may either process the control-plane data to identify data packets for example with matching IMSI, or pass it to the application module 258 for processing. If the control-plane data is passed to the application module 258, the application module 258 analyzes and extracts the information identifying a data packet flow associated with the targeted user or the IMSI to be matched. The extracted information identifying the data packet flow is then communicated back to the OpenFlow switch 256. The extracted information is, for example, maintained in a flow table entry, within the OpenFlow switch 256, with corresponding action(s) to be applied to the identified data packet flow. With the setting of the information identifying the data packet flow, the OpenFlow switch 256 is enabled to apply the defined actions to the identified user level data packet flow.

Figure 4B:
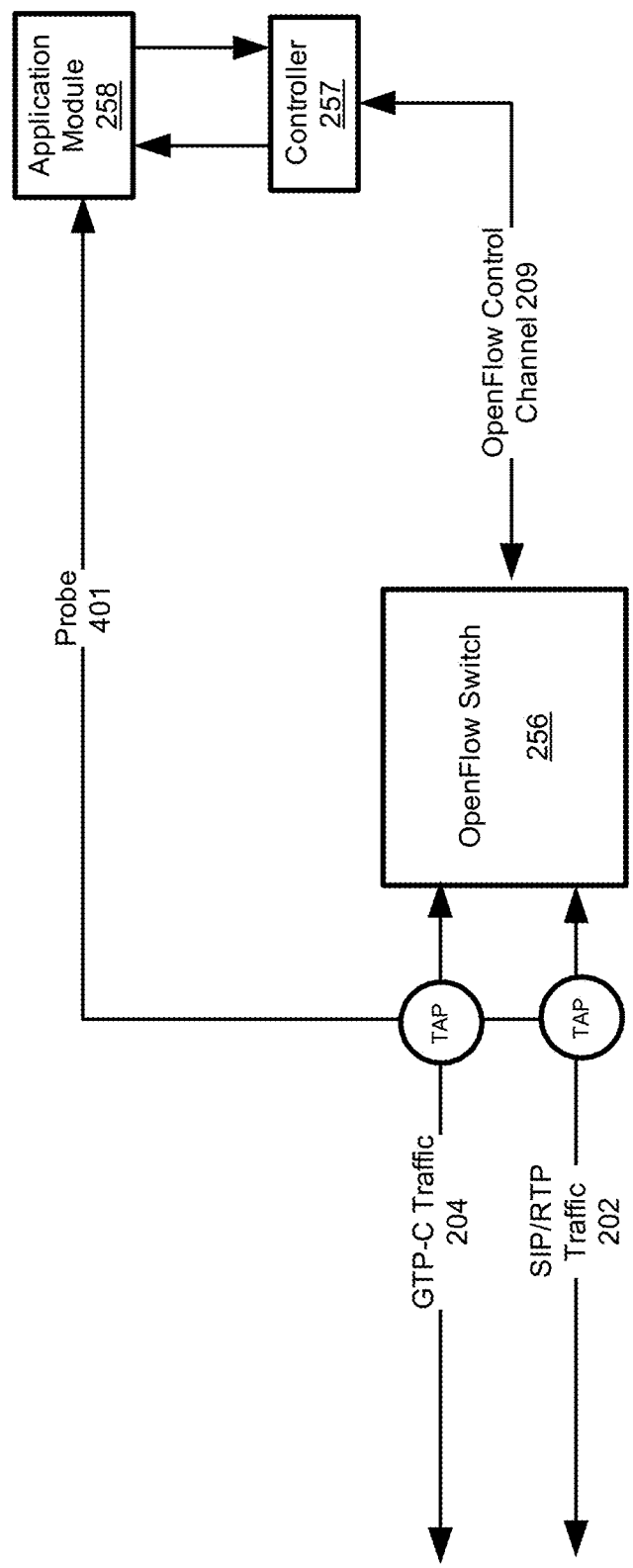
FIG. 4B is a block diagram illustrating access of control-plane data to identify a data packet flow, according to a second example embodiment.

FIG. 4B is a block diagram illustrating access of control-plane data to identify a data packet flow, according to a second example embodiment. In the example of FIG. 4B, the external application module 258 collects user information and corresponding data packet flow, or tunnel, information by monitoring control channel(s) traversing the OpenFlow switch 256. Specifically, a data probe 401 is used to tap into a physical link carrying control-plane data to the OpenFlow switch 256. The probe 401 may be configured to target the specific types of traffic, e.g., GTP-C or SIP, based on protocol indicator. The selected traffic packets are sent to the application module 258 for analysis in real-time fashion. The application module extracts user information that matches the pre-provisioned targeted user(s) or user group(s), e.g., per IMSI(s) or IMSI ranges, and the corresponding data packet flow, or tunnel, identification information to be used in GTP tunnel, or dynamical allocated IP end points in RTP session, to carry user(s) data payloads. The extracted information, together with corresponding defined management applications, are passed or relayed to the controller 257. The controller 257 forward the information, or sends control instructions, to the OpenFlow switch 256 via Open Flow Protocol 209 to set flow table entries within the OpenFlow switch 256.

Figure 5B:
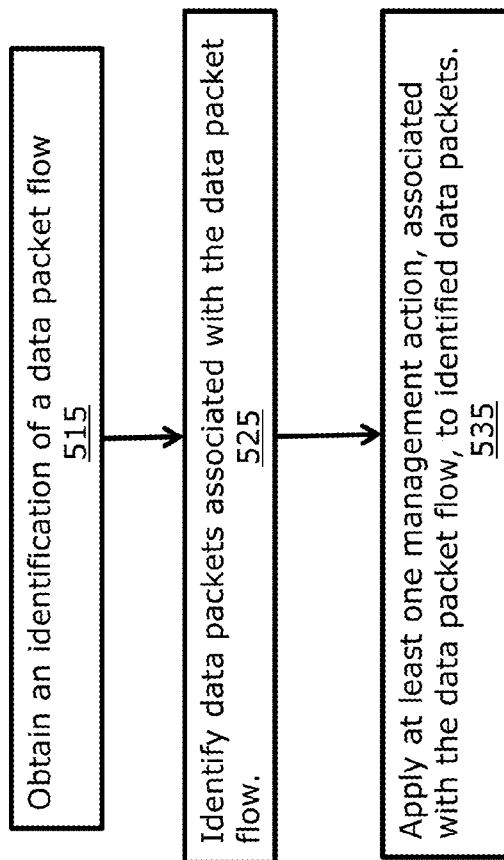
FIG. 5B is a flowchart illustrating a method of managing a data packet flow at an inter-network system performed by the switch according to at least one example embodiment.
Figure 5A:
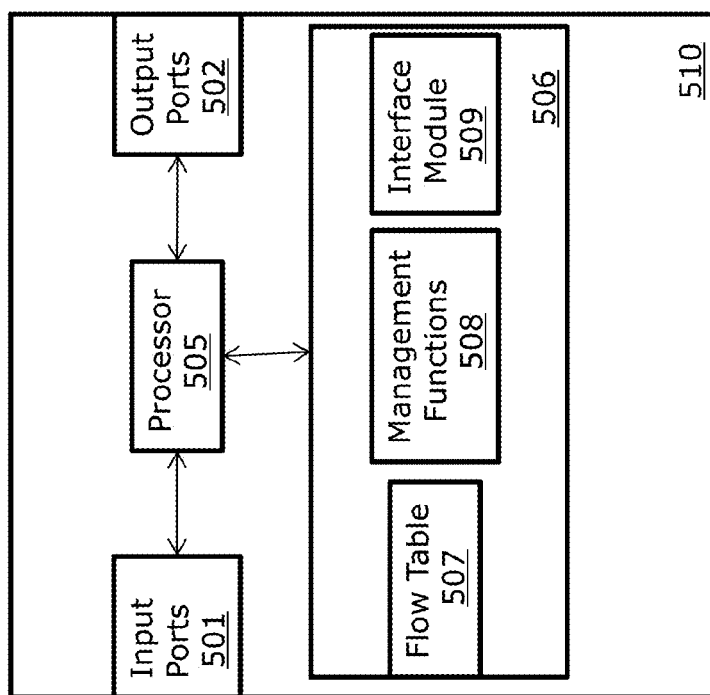
FIG. 5A is a block diagram of a switch, according to at least one example embodiment.

FIG. 5A is a block diagram of a switch 510, according to at least one example embodiment. The switch 510 may be an OpenFlow switch 256 configured to manage a data packet flow, in an inter-network system, according to embodiments described herein. Alternatively, the switch 510 may be a switch designed to manage data packet flows in inter-network systems according to embodiments described herein. The switch 510 includes one or more input ports 501 for receiving data packets and/or input signals, and one or more output ports 502 for sending data packets and/or output signals to other network elements. The switch 510 also includes a memory component 506 configured to store data and computer code instructions, and a processor 505 configured to execute the computer code instructions stored in the memory component 506 and processing operations performed by the switch 510.

The memory component 506 includes, as is the case for an OpenFlow switch 256, a software agent 509 defining messages, such as, packet-received, send-packet-out, modify-forwarding-table, and get-stats, for communicating with the controller 257. The memory component 506 also includes a flow table 507 defining actions to be performed for different data packet flows. According to at least one aspect, each entry of the flow table 507 includes an identification of a data packet flow, e.g., a tunnel ID, session ID, user ID, other IDs, or a combination thereof, one or more actions, e.g., send-out-port, modify-field, drop, or the like, to be applied to data packets in the corresponding identified data packet flow, and one or more statistical parameters, e.g., number of packets, number of bits, for keeping track of statistics of the corresponding identified data packet flow. The memory component 506 may further include a software agent 508 with computer code instructions corresponding to one or more management functions to be applied to data packet flows. For example, if an action described in the flow table 507 is implemented in software, the corresponding code is retrieved from the software agent 508 for execution. A person skilled in the art should appreciate that the software agents and the flow table may be implemented differently.

FIG. 5B is a flowchart illustrating a method of managing a data packet flow at an inter-network system performed by the switch 510 according to at least one example embodiment. At block 515, the switch 510 obtains an identification of data packet flow to be managed. According to at least one aspect, the switch 510 further obtains the location information, such as bit position with mask length, to read the identification. The identification of the data packet flow includes, for example, a tunnel ID, a session ID, one or more other fields extracted from corresponding control-plane data, or a combination thereof. The switch 510 may receive the data packet flow identification from the controller 257 through a control channel, e.g., 209. The switch 510 may further obtain an indication of one or more actions, with the data packet flow identification, to be performed on the corresponding identified data packet flow. Also, an indication of one or more statistics to be tracked for the identified data packet flow may also be communicated to the switch 510. Alternatively, the statistics to be tracked may be the same for all data packet flows, and, as such, are not communicated to the switch 510. According to at least one aspect, the data packet flow identification, the indication of the one or more actions, and/or the indication of the statistics to be tracked are placed in a flow table entry, corresponding to the identified data packet flow, of the flow table 507.

At block 525, the switch 510 identified data packets associated with the identified data packet flow. In identifying data packets associated with the identified data packet flow, the switch 510 (1) intercepts user-plane data packets, (2) decodes one or more portions of each of the intercepted packets, for example, to extract corresponding layer-four and/or layer-five data field(s), and (3) compare the extracted data field(s) with the data packet flow identification. For intercepted data packets identified to be associated with the identified data packet flow, the switch 510 applies at block 535 one or more management actions, e.g., as indicated in flow table entry corresponding to the identified data packet flow. The one or more managing actions may include generating statistics related to the data packet flow and reporting the statistics to the application module 258 and/or controller 257. Adjusting a data rate associated with the identified data packet flow, or redirecting data packets associated with the identified data packet flow may also be among managing actions applied to data packets associated with the identified data packet flow. The one or more managing actions may, alternatively or in addition, include monitoring the data packet flow and sending a message to a user associated with the data packet flow upon a condition being met, e.g., based on user's consumption of a service. A person skilled in the art should appreciate that other managing applications may be performed by the switch 510.

Figure 6B:
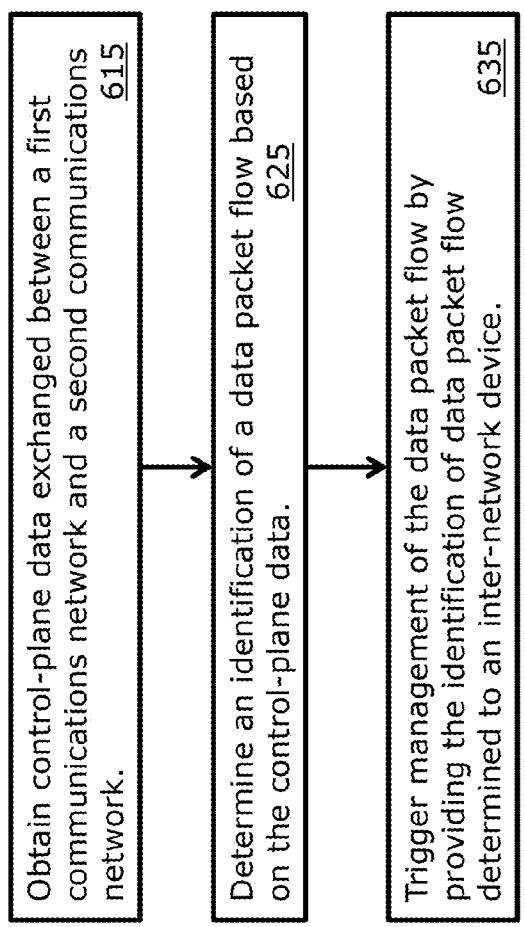
FIG. 6B is a flowchart illustrating a method of triggering management of a data packet flow at an inter-network system performed by the processing device according to at least one example embodiment.
Figure 6A:
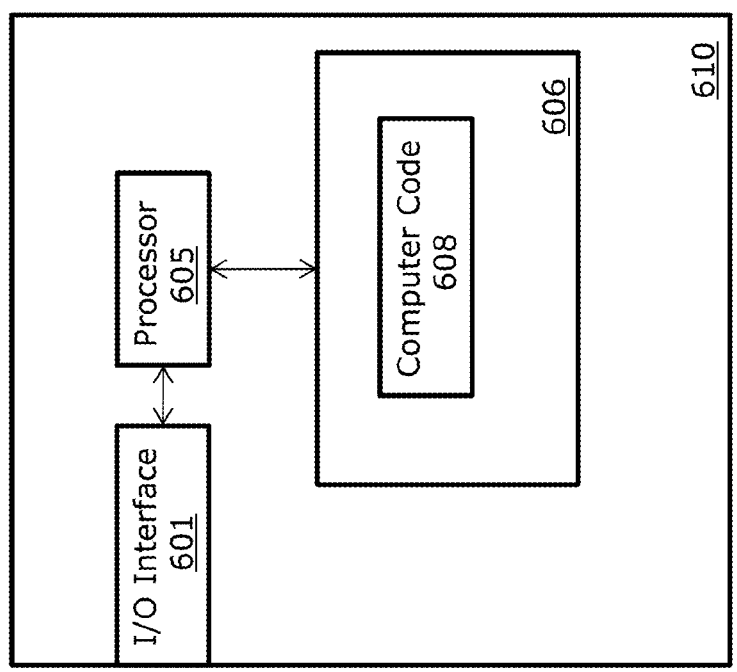
FIG. 6A is a block diagram of a processing device including the application module, according to at least one example embodiment.

FIG. 6A is a block diagram of a processing device 610 including the application module 258, according to at least one example embodiment. The processing device 610 includes an input/output (I/O) interface 601, a processor 605, and a memory component 606 with computer code instructions 608 stored thereon. The computer code instructions include instructions 608 corresponding to processing operations performed by the application module 258. The computer code instructions 608 may further include other instructions. For example, the processing device 610 may carry processing operations associated with both the application module 258 and the controller 257. Alternatively, the application module 258 may be on a separate device than the controller 257. A person skilled in the art should appreciate that the processing device 610 may be a computer device, a server device, or another electronic device configured to perform operations associated with application module 258.

FIG. 6B is a flowchart illustrating a method of triggering management of a data packet flow at an inter-network system performed by the processing device 610 according to at least one example embodiment. At block 615, the processing device 610 obtains control-plane data, e.g., SIP data, GTP data, or the like, exchanged between a first communications network and a second communications network. The control-plane data includes, for example, all control-plane data packets, one or more portions of control-plane data packets, one or more fields or headers associated with control-plane data packets, or the like. For example, as illustrated in FIG. 4B and the corresponding description above, the processing device 610 may probe 401 a physical data link an obtain control-plane data packets exchanged through the physical link probed. Alternatively, as illustrated in FIG. 4A and the corresponding description above, the control-plane data packets passing obtained by the processing device 610 may be filtered based on a specific destination port number, a specific IMSI, or the like. In such case, the processing device 610 provides the switch 510 and/or the controller 257 filtering parameters, e.g., IMSI, device ID, or other parameter values, for filtering control-plane data packets. A person skilled in the art should appreciate that the controller or the switch may be configured to extract specific portions, e.g., headers and/or fields, of the control-plane data packets, and send the extracted portions to the processing device 610 as the control-plane data.

At block 625, the processing device 610 determines an identification of a data packet flow, e.g., tunnel ID, session ID, user ID, or the like, based on the obtained control-plane data. Determining an identification of the data packet flow includes, for example, extracting one or more transport protocol, and/or session protocol, fields from the control-plane data obtained, and/or decoding the one or more transport protocol, and/or session protocol, fields. The transport protocol may be TCP, UDP, or any other transport protocol known to people skilled in the art. Once the identification of the data packet flow is known, the processing device triggers management 635 of the data packet flow by providing the identification of data packet flow determined to the switch 510. Triggering management of the data packet flow may also be achieved by sending instructions/messages including the data packet flow identification determined and indication(s) of one or more management actions to be applied to the data packet flow.

While this invention has been particularly shown and described with references to example embodiments thereof, it will be understood by those skilled in the art that various changes in form and details may be made therein without departing from the scope of the invention encompassed by the appended claims.

What is claimed is:

1. A method of managing a data packet flow at a user-plane at an inter-network system for a data session between a user equipment (UE) roaming in a visited communications network and a home communications network, the method comprising:
    obtaining, by a processing device, control-plane data packets exchanged between the visited communications network and the home communications network, wherein the processing device is intermediate between the visited communications network and the home communications network;
    receiving information identifying the UE or a corresponding user of the UE;
    filtering the control-plane data packets based on the identifying information received;
    extracting one or more transport protocol and/or session protocol data fields from the filtered control-plane data packets to determine an identification of the data packet flow at the user-plane; and
    triggering management of the data packet flow by sending to an OpenFlow switch an instruction including the data packet flow identification determined and one or more indications of one or more roaming and/or service management actions to be applied to the data packet flow at the user-plane.

2. The method as recited in claim 1, wherein obtaining the control-plane data packets includes receiving the control-plane data packets from the OpenFlow switch, the control-plane data packets being accessed by the OpenFlow switch at a communications link between the visited communications network and the home communications network.

3. The method as recited in claim 1, wherein obtaining the control-plane data packets includes accessing, at a communications link, the control-plane data packets exchanged between the visited communications network and the home communications network.

4. The method as recited in claim 1, wherein the identification of the data packet flow includes a tunnel identifier.

5. The method as recited in claim 1, wherein the identification of the data packet flow includes a session identifier.

6. The method as recited in claim 1, wherein the identification of the data packet flow includes a user identifier.

7. The method as recited in claim 1, wherein extracting one or more transport protocol and/or session protocol data fields from the filtered control-plane data packets includes extracting user datagram protocol (UDP) or transport control protocol (TCP) data fields.

8. The method as recited in claim 1, wherein the control-plane data packets include session initiation protocol (SIP) data.

9. The method as recited in claim 1, wherein the control-plane data packets include general packet radio service (GPRS) tunneling protocol (GTP) data.

10. The method as recited in claim 1, wherein the one or more roaming and/or service management actions to be applied to the data packet flow includes:
    generating statistics related to the data packet flow; and
    reporting the statistics generated.

11. The method as recited in claim 1, wherein the one or more roaming and/or service management actions to be applied to the data packet flow includes adjusting a data rate associated with the data packet flow.

12. The method as recited in claim 1, wherein the one or more roaming and/or service management actions to be applied to the data packet flow includes redirecting data packets associated with the data packet flow.

13. The method as recited in claim 1, wherein the one or more roaming and/or service management actions to be applied to the data packet flow includes monitoring the data packet flow and sending a message to the UE or the corresponding user of the UE associated with the data packet flow upon a condition being met.

14. The method as recited in claim 1, wherein the information identifying the UE or the corresponding user of the UE includes at least one of an international mobile subscriber identity (IMSI), a range of IMSIs, a mobile station international subscriber directory number (MSISDN), a group of MSISDNs, a destination port number, and a device identifier.

15. An apparatus for managing a data packet flow at a user-plane at an interworking system for a data session between a user equipment (UE) roaming in a visited communications network and a home communications network, the apparatus comprising:
 a processor; and
 a memory with computer code instructions stored thereon,
 the processor and the memory, with the computer code instructions stored thereon, configured to cause the apparatus to:
  obtain control-plane data packets exchanged between the visited communications network and the home communications network wherein the apparatus is intermediate between the visited communications network and the home communications network;
  receive information identifying the UE or a corresponding user of the UE;
  filter the control-plane data packets based on the identifying information received;
  extract one or more transport protocol and/or session protocol data fields from the filtered control-plane data packets to determine an identification of the data packet flow at the user-plane; and
  trigger management of the data packet flow by sending to an OpenFlow switch an instruction including the data packet flow identification determined and one or more indications of one or more roaming and/or service management actions to be applied to the data packet flow at the user-plane.

16. The apparatus as recited in claim 15, wherein in obtaining the control-plane data packets, the processor and the memory, with the computer code instructions stored thereon, are further configured to cause the apparatus to receive the control-plane data packets from the OpenFlow switch, the OpenFlow switch accessing, at a communications link, the control-plane data packets exchanged between the visited communications network and the home communications network.

17. The apparatus as recited in claim 15, wherein in obtaining the control-plane data packets, the processor and the memory, with the computer code instructions stored thereon, are further configured to cause the apparatus to access, at a communications link, the control-plane data packets exchanged between the visited communications network and the home communications network.

18. The apparatus as recited in claim 15, wherein the identification of the data packet flow includes a tunnel identifier.

19. The apparatus as recited in claim 15, wherein the identification of the data packet flow includes a session identifier.

20. The apparatus as recited in claim 15, wherein the identification of the data packet flow includes a user identifier.

21. The apparatus as recited in claim 15, wherein extracting one or more transport protocol and/or session protocol data fields from the filtered control-plane data packets includes extracting user datagram protocol (UDP) or transport control protocol (TCP) data fields.

22. The apparatus as recited in claim 15, wherein the control-plane data packets include session initiation protocol (SIP) data.

23. The apparatus as recited in claim 15, wherein the control-plane data packets include general packet radio service (GPRS) tunneling protocol (GTP) data.

24. The apparatus as recited in claim 15, wherein the one or more roaming and/or service management actions to be applied to the data packet flow includes:
 generating statistics related to the data packet flow; and
 reporting the statistics generated.

25. The apparatus as recited in claim 15, wherein the one or more roaming and/or service management actions to be applied to the data packet flow includes adjusting a data rate associated with the data packet flow.

26. The apparatus as recited in claim 15, wherein the one or more roaming and/or service management actions to be applied to the data packet flow includes redirecting data packets associated with the data packet flow.

27. The apparatus as recited in claim 15, wherein the one or more roaming and/or service management actions to be applied to the data packet flow includes monitoring the data packet flow and sending a message to the UE or the corresponding user of the UE associated with the data packet flow upon a condition being met.

28. The apparatus as recited in claim 15, wherein the information identifying the UE or the corresponding user of the UE includes at least one of an international mobile subscriber identity (IMSI), a range of IMSIs, a mobile station international subscriber directory number (MSISDN), a group of MSISDNs, a destination port number, and a device identifier.

* * * * *